(12) United States Patent
Dewhirst

(10) Patent No.: US 10,105,891 B2
(45) Date of Patent: Oct. 23, 2018

(54) APPARATUS FOR FORMING THE END PORTIONS OF FIBRE REINFORCED THERMOPLASTIC COMPOSITE TUBES

(71) Applicant: Crompton Technology Group Ltd., Oxfordshire, Banbury (GB)

(72) Inventor: Michael J. Dewhirst, Warwickshire (GB)

(73) Assignee: CROMPTON TECHNOLOGY GROUP LTD., Oxfordshire (GB)

(*) Notice: Subject to any disclaimer, the term of this patent is extended or adjusted under 35 U.S.C. 154(b) by 0 days.

(21) Appl. No.: 14/319,722

(22) Filed: Jun. 30, 2014

(65) Prior Publication Data

US 2014/0348972 A1 Nov. 27, 2014

Related U.S. Application Data

(62) Division of application No. 13/140,959, filed as application No. PCT/GB2009/002901 on Dec. 17, 2009, now Pat. No. 8,801,994.

(30) Foreign Application Priority Data

Dec. 22, 2008 (GB) .................................. 0823321.5

(51) Int. Cl.
*B29C 53/00* (2006.01)
*B29C 57/00* (2006.01)
(Continued)

(52) U.S. Cl.
CPC ............ *B29C 57/00* (2013.01); *B29B 13/025* (2013.01); *B29C 43/021* (2013.01); *F16L 47/14* (2013.01);
(Continued)

(58) Field of Classification Search
CPC . B29C 57/00; B29C 43/021; B29C 2014/024; B29C 2014/522; B29C 2014/3628; B29C 33/06
(Continued)

(56) References Cited

U.S. PATENT DOCUMENTS

| | | |
|---|---|---|
| 4,113,813 A | 9/1978 | Wilson |
| 4,394,343 A | 7/1983 | Acda et al. |

(Continued)

FOREIGN PATENT DOCUMENTS

| | | |
|---|---|---|
| DE | 202006003163 U1 | 6/2006 |
| EP | 0694726 A1 | 1/1996 |

(Continued)

OTHER PUBLICATIONS

International Search report of the International Application No. PCT/GB2009/002901 mailed Apr. 28, 2010.

*Primary Examiner* — Joseph S Del Sole
*Assistant Examiner* — Thu Khanh T Nguyen
(74) *Attorney, Agent, or Firm* — Cantor Colburn LLP

(57) ABSTRACT

A method and apparatus for forming at least one external annular flange (48 or 49) adjacent one end of a fiber reinforced thermoplastic tube (10) in which the tube (10) is mounted on a mandrel (12) and a first end portion of the tube is clamped in a collar (13) having at least one internal annular cavity (18 or 19) for forming a flange, a second end portion of the tube in the region (R1, R2) of the cavity is heated to soften the thermoplastic, and an axial load (L) is applied to the end of the tube by a piston (24) causing the softened tube to flow into the cavity (18, 19) in the collar (13) to form a flange on the tube.

5 Claims, 2 Drawing Sheets

(51) Int. Cl.
 *B29B 13/02*  (2006.01)
 *B29C 43/02*  (2006.01)
 *F16L 47/14*  (2006.01)
 *B29C 33/06*  (2006.01)
 *B29C 43/36*  (2006.01)
 *B29C 43/52*  (2006.01)
 *B29K 105/06*  (2006.01)
 *B29K 105/08*  (2006.01)
 *B29K 105/00*  (2006.01)
 *B29L 23/00*  (2006.01)

(52) U.S. Cl.
 CPC ........ *B29C 33/06* (2013.01); *B29C 2043/024* (2013.01); *B29C 2043/3628* (2013.01); *B29C 2043/522* (2013.01); *B29K 2105/06* (2013.01); *B29K 2105/08* (2013.01); *B29K 2105/258* (2013.01); *B29L 2023/00* (2013.01)

(58) Field of Classification Search
 USPC ............. 425/326.1, 327, 392–393, 504, 508, 425/DIG. 218
 See application file for complete search history.

(56) References Cited

U.S. PATENT DOCUMENTS 6,033,617 A * 3/2000 Guzowski ............ B29C 57/025
                  425/393
7,128,558 B2 10/2006 Lum et al.
7,776,248 B2 8/2010 Macovaz et al.

FOREIGN PATENT DOCUMENTS

| | | |
|---|---|---|
| EP | 0832732 A2 | 1/1998 |
| GB | 928912 A | 6/1963 |
| WO | 8900492 A1 | 1/1989 |

* cited by examiner

APPARATUS FOR FORMING THE END PORTIONS OF FIBRE REINFORCED THERMOPLASTIC COMPOSITE TUBES

RELATED APPLICATION

This application claims priority to U.S. patent application Ser. No. 13/140,959, filed on Aug. 3, 2011; which, in turn, claims priority to PCT Application PCT/GB2009/002901, filed on Dec. 17, 2009, and to UK Application 0823321.5, filed Dec. 22, 2008. The entire contents of these references are hereby incorporated by reference in their entirety.

FIELD

This invention relates to a method for forming the end portions of fibre reinforced thermoplastic tube, in particular wound fibre composite tube.

BACKGROUND OF THE INVENTION

Composite polymeric tubes and pipes may be produced from any fiber and polymer matrix, most typically from glass and carbon fibre with a thermoplastic or thermosetting resin matrix. EP-A-0694726 discloses a method of forming an external groove on the end portion of a composite tube having a thermosetting resin matrix in which a split die is pressed into the external surface of the uncured pipe material on the mandrel to form a groove.

A method of forming the end portion of a thermoplastic tube in order to improve interconnections between tubes is shown in GB-A-928912.

The present invention provides a method of forming flanges and/or a groove in the external surface of a thermoplastic pipe or tube and in particular for a fibre reinforced thermoplastic composite pipe or tube.

STATEMENTS OF INVENTION

According to a first aspect of the present invention there is provided a method of forming at least one external annular flange adjacent one end of a fibre reinforced thermoplastic tube or pipe, wherein said tube is mounted on a mandrel and a first end portion of the tube is clamped in a collar having at least one internal annular cavity for forming a flange, a second end portion of the tube in the region of the cavity is heated to soften the thermoplastic, and an axial load is applied to the end of the tube causing the softened second portion to flow into the cavity in the collar to form the flange.

Preferably, the collar is provided with two annular cavities, the second of which is nearer the end of the tube, and said second portion of the tube is in the region of both cavities, the tube being heated to soften firstly in the region of the first cavity and is caused to flow therein under said axial load to form a first flange and then is softened in the region of the second cavity and is caused to flow therein under continued axial load to form a second flange.

After forming the first flange, the tube in the region of the first cavity is allowed to cool as heat is applied in the region of the second cavity.

When the two flanges are proximate each other, the gap between the two flanges forms an external groove which may be utilized for housing an 'O' ring.

The axial load may applied by a piston slidably mounted on the mandrel.

The present method may be advantageously applied to a fibre reinforced composite tube or pipe in which reinforcing fibres and thermoplastic fibres forming the polymeric resin matrix are wound around a mandrel to provide a composite tubular pre-form on the mandrel. The mandrel with the pre-form thereon is then passed through a heated die to compact and reduce the diameter of the pre-form and soften the matrix causing the resin the flow through the reinforcing fibres to form the composite.

According a second aspect of the invention there is provided a fibre reinforced thermoplastic tube having at least one external annular flange thereon and which was formed by a method according to the first aspect of the invention.

Yet another aspect of the present invention comprise apparatus for forming at least one flange adjacent an end portion of a fibre reinforced thermoplastic tube, said apparatus comprising a split cylindrical collar having a respective annular cavity on its inner surface for forming each flange, at least one heat source, and a piston coaxial with the cylindrical collar for exerting an axial load on the end of the tube, the collar having a first portion which provides a clamping zone for gripping a first end portion of the tube, a second portion for heating the tube in the region of the cavity, and a third portion housing the piston so as to apply a load to the end of the tube causing a heated potion thereof to flow into said cavity.

Preferably, the collar has two annular cavities, the second of which is nearer the piston, and said second portion of the tube is in the region of both cavities, the heat source softening the tube firstly in the region of the first cavity and then softening the tube in the region of the second cavity, the tube material being caused to flow firstly into the first cavity and then into the second cavity under an axial load generated by the piston, to form the two flanges.

Preferably the collar has a heat source for each cavity, each heat source softening the tube in the region of each cavity and being operated in turn. A heat source may additionally or alternatively be provided within a mandrel located internally of the tube.

DESCRIPTION OF THE DRAWINGS

The invention will be described by example and with reference to the accompanying drawings in which.

DETAILED DESCRIPTION OF THE INVENTION

Figure 1:
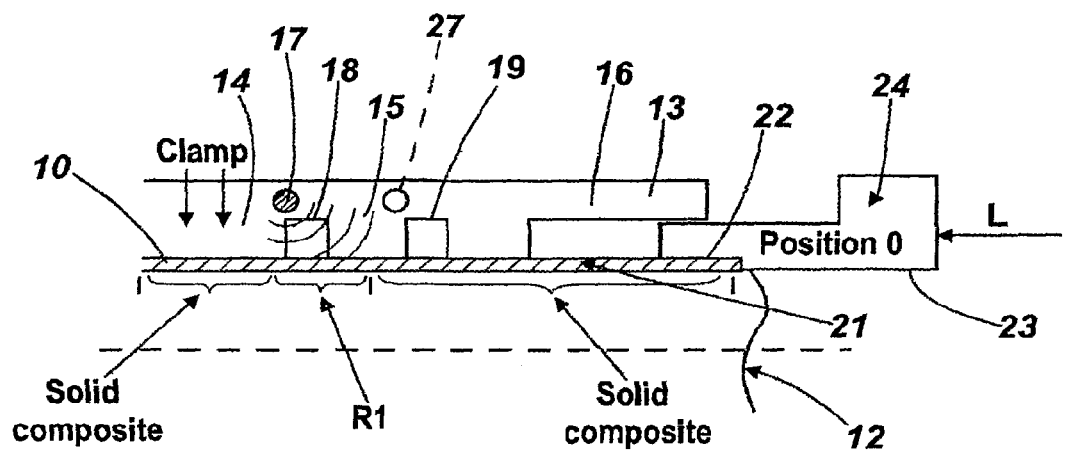
FIG. 1 is a schematic drawing of apparatus according to the present invention showing a first step in the method also according to the Invention.
Figure 2:
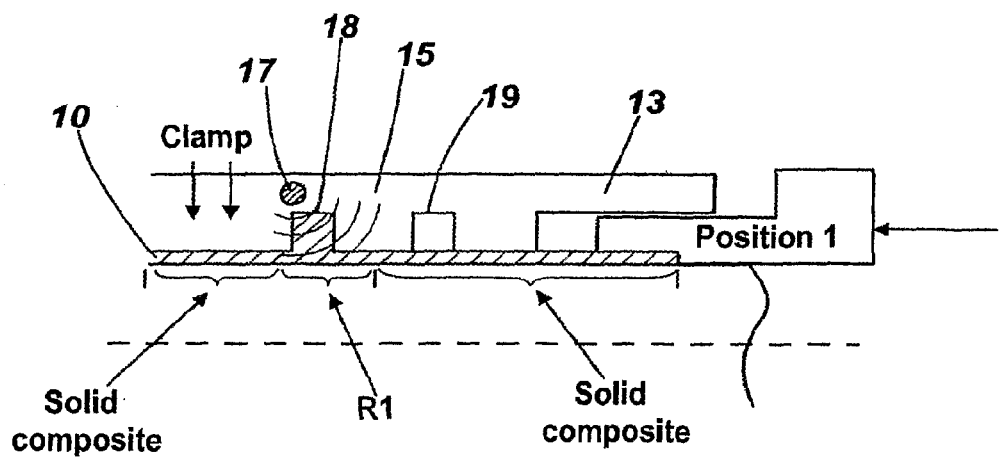
FIG. 2 shows a second step in the method of the invention.
Figure 3:
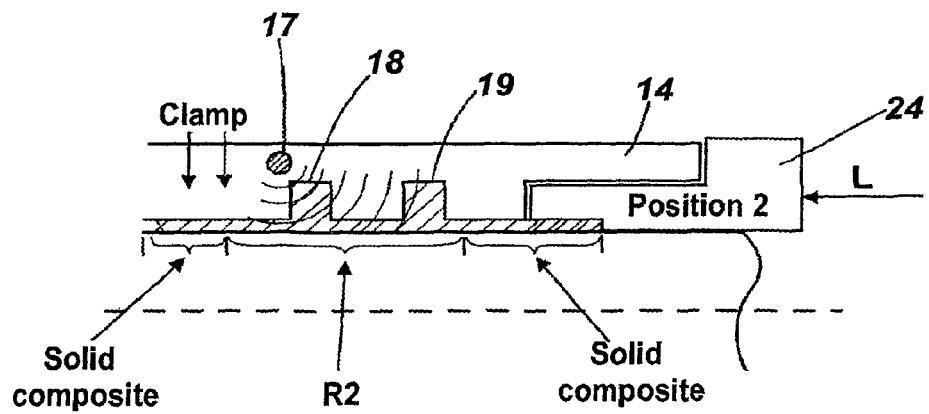
FIG. 3 is final step in the method of the invention.

With reference to FIGS. 1 to 3, there is shown a fibre reinforced thermoplastic composite tube or pipe 10 which may be formed from any reinforcing fibre and any thermoplastic resin matrix. Preferably, the composite tube comprises substantially continuous reinforcing fibres, such as glass fibre and/or carbon fibre and the thermoplastic matrix could be any thermoplastic, preferably one of PEI (polyetherimide), PPS (Polyphenylenesulpone), PAI (Polyamide-imide), PES (polyethersulphone) and more preferably PEEK (Polyetheretherketone).

The thermoplastic composite tube 10 is placed on a mandrel 12, and the composite tube 10 is then clamped within a cylindrical collar 13. The collar 13 is preferably a split collar (split into arcuate segments) and comprises at least three zones, a clamping zone 14, a heating zone 15 and a compression loading zone 16. The heating zone is provided with at least one heat source 17 and has internal annular cavities 18,19 on its inner surface which will define the final shape of the composite tube end. The clamping force from the cylindrical collar 13 restrains any movement of the composite tube along the axis of the mandrel 12. The clamping zone may also conduct heat away from the adjacent tube 10 keeping the tube rigid/solid in that region. A piston 24 is coaxial of the collar 13 is slidably mounted within the compression zone 16 of the collar. The piston 24 has an internal through bore 23 which is slidable on the mandrel 12 and has a recess 22 in its front face to receive the end portion 21 of the tube 10.

The zones 13,14 and 16 may be formed as separate components which are then brought together to form the collar.

During the first stage of the process, as shown in FIG. 1, the tube is clamped by the collar 13 to prevent axial movement and heat emitted from the heat source 17 is applied in the region R1 of the first and nearest cavity 18. The heat softens the composite in the region R1 of the cavity while the piston 24 slides over the mandrel 12 applying an axial load L to the composite tube 10.

In an alternative arrangement, the piston 24 may be static and the collar 13 moved towards the static piston.

Referring now to FIG. 2, the axial movement of the piston 24 causes the soft region R1 of the composite tube to bend and flow filling the first cavity 18 as shown. By this stage, the continuing applied heat melts the thermoplastic matrix, allowing the cavity 18 closest to the heat source to be fully filled.

Referring now to FIG. 3, as the heat source 17 continues to emit heat, the composite pipe 10 further softens and the now softened region R2 further includes material adjacent the cavity 19 furthest from the heat source 17. The axial load exerted by the continuing sliding action of the piston 24 causes the second cavity 19 to be filled. The continuing applied heat eventually melts the thermoplastic matrix in the second cavity 19 and the cavity is fully filled.

The melt temperature of the thermoplastic coupled with the heat output from the heat source 17 may in some cases cause the regions R1 and R2 to soften at substantially the same time.

The instant at which the cavities 18 & 19 are fully filled with the formed composite coincides with the instant at which the piston 24 reaches its final position, fully engaged with the matching compression zone 16 on the collar. At this instant the heat source is stopped and the molten thermoplastic composite gradually returns to its solid state.

Figure 4:
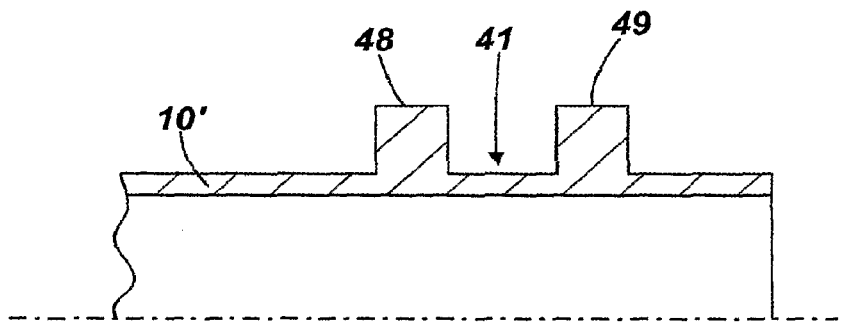
FIG. 4 is tube having integrally formed flanges and groove in accordance with a further aspect of the Invention

The final shape of the composite tube 10' is shown in FIG. 4 and now includes integrally formed annular flanges 48, 49 with an annular slot or groove 41. The groove 41 may be used to accommodate an O-ring for connection to other surrounding components. Such a connection may be useful for tubes which transport fluids, for example fuel pipes used in aircraft.

In an alternative arrangement, shown in FIG. 1 only, a second heat source 27 may be provided adjacent the second cavity 19 so that for each cavity 18 & 19, each respective heat source 17 & 27 softens the tube in the region of each respective cavity. The two heat sources are operated in turn to first soften the region which fills the cavity 18 and then to soften the region which fills the cavity 19.

Figure 5:
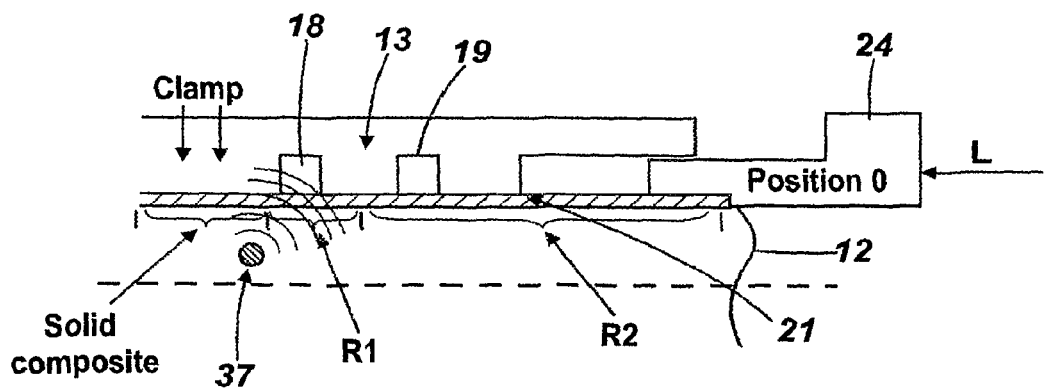
FIG. 5 shows an alternative apparatus in which the heat source is located within the mandrel 12.

A further arrangement is shown in FIG. 5 in which a heat source 37 is provided within the mandrel 12. The internal heat source 37 may be provided as an alternative to the external heat sources 17 and/or 27 or as an alternative thereto.

The invention claimed is:

1. Moulding apparatus for forming at least one flange adjacent an end portion of a wound fibre reinforced thermoplastic tube, said apparatus comprising a cylindrical collar having a respective annular cavity on its inner surface for forming each flange, at least one heat source, and a piston coaxial with the cylindrical collar for exerting an axial load on the end of the tube, the collar having a first portion providing a clamping zone for gripping an first end portion of the tube, a second portion heating the tube in the region of the cavity, and a third portion housing the piston so as to apply a load to the end of the tube causing a heated portion thereof to bend and flow into said cavity.

2. Apparatus as claimed in claim 1, wherein the collar has two annular cavities, the second of which is nearer the piston, and said second portion of the tube is in the region of both cavities, the heat source softening the tube firstly in the region of the first cavity and then softening the tube in the region of the second cavity, the tube material being caused to bend and flow firstly into the first cavity and then into the second cavity under an axial load generated by the piston to form two integral flanges on the tube.

3. Apparatus as claimed in claim 1, wherein the collar has a heat source for each cavity, each heat source softening the tube in the region of each cavity and being operated in turn.

4. Apparatus as claimed in claim 1, wherein the tube is held on a mandrel and the piston is slidably mounted on the mandrel.

5. Apparatus as claimed in claim 4, wherein a heat source may be provided within the mandrel.

* * * * *